United States Patent [19]
Branch

[11] Patent Number: 5,277,586
[45] Date of Patent: Jan. 11, 1994

[54] METHOD AND APPARATUS FOR TEACHING PERSONS WITH READING AND SPEAKING DYSFUNCTIONS

[76] Inventor: Kimberly A. Branch, 2536 Traymore Rd., University Heights, Ohio 44118

[21] Appl. No.: 875,095

[22] Filed: Apr. 28, 1992

[51] Int. Cl.$^5$ ............................................. G09B 17/00
[52] U.S. Cl. .................................... 434/184; 434/178
[58] Field of Search ............... 434/172, 167, 170, 184, 434/178; 273/299, 292

[56] References Cited

U.S. PATENT DOCUMENTS

| | | | |
|---|---|---|---|
| 1,099,324 | 6/1914 | Thomson | 434/172 |
| 2,265,334 | 12/1941 | Armbruster | 434/172 X |
| 2,783,998 | 3/1957 | Collins | 273/299 |
| 4,204,343 | 5/1980 | Brooks | 434/172 |
| 4,379,699 | 4/1983 | Nelson | 434/184 |
| 4,961,640 | 10/1990 | Irlen | 351/44 |
| 5,067,806 | 11/1991 | Kwasman | 351/233 |

*Primary Examiner*—Gene Mancene
*Assistant Examiner*—Jeffrey A. Smith
*Attorney, Agent, or Firm*—James H. Tilberry

[57] ABSTRACT

A method of teaching children with reading and speaking dysfunctions. The inventive method utilizes a deck of cards upon which are imprinted on the faces of the cards selected letters of the alphabet and selected combinations of letters of the alphabet. The child is taught to utilize the cards in accordance with prescribed rules to form words and to pronounce the words formed. This therapeutic and diagnostic teaching method is presented to the child in a game format which stimulates interest and a will to succeed.

8 Claims, 1 Drawing Sheet

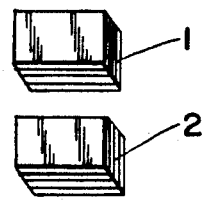

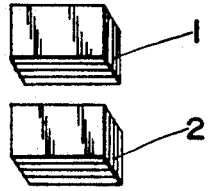

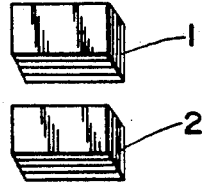

METHOD AND APPARATUS FOR TEACHING PERSONS WITH READING AND SPEAKING DYSFUNCTIONS

BACKGROUND OF THE INVENTION

1. Field of the Invention:

The field of invention relates to therapeutic and diagnostic teaching aids used to improve reading and speaking skills in persons dysfunctional in these areas.

2. Description of Related Art:

Teaching the learning disabled has been a field of intensive research and study for at least the past two decades. The field has expanded so rapidly that a shortage of competent teachers is painfully evident, as well as a lack of appropriate services and teaching aids. Concurrent with this growth have occurred strident and sometimes bitter controversies regarding theory and practice. Professionals from every sector of special education, general educators, physical educators, neurologists, opthamologists, pediatricians, physical therapists, psychologists, and others, have taken an active interest in the learning disability explosion. As a consequence, many theories on learning disabilities have been propounded, together with an equal number of remedies, which have often met with indifferent success. Various learning disabilities have been diagnosed to include language, visual, auditory, perceptual, and motor dysfunctions, and, less often, hyperactivity or problems with attention span and/or socialization. The one thing known with absolute certainty is that millions of children and adults are poor readers.

Many reading disabilities are now categorized as dyslexia, which is generally considered to be a minimal brain dysfunction that manifests itself in various disorders of visual perception. The symptoms generally agreed upon by specialists in the field are difficulty in spelling, reading, writing, and in processing sounds and letters. As is true with many difficult diagnoses, the numerous and variable symptoms of dyslexia are more readily identifiable than are the causes or cures. One recent breakthrough has been the discovery that reading disability is directly attributable in some cases to light sensitivity. In this form of dyslexia, the inability to process written words is believed to be caused by interference of a white background with the black imprinting. This dysfunction, which is probably perceptual rather than a defect in vision, has been hypothesized to be the difficulty of processing full-spectrum light efficiently. Helen Irlen, author of *Reading by the Colors* (Garden City, N.Y.: Avery Publishing Group, Inc., 1991) has called this dysfunction Scoptopic Sensitivity Syndrome (SSS). It is Irlen's contention that individuals with SSS perceive the world in a distorted way as a result of sensitivity to certain wave lengths of light, and that the mere use of colored overlays on reading materials in some cases, and the use of tinted lenses in other cases, can achieve remarkable results in reading improvement for these afflicted individuals.

There does not exist in the prior art at the present time any single solution for reading and learning disabilities, nor is it likely that there will ever be a single solution. Similarly, there is no single diagnostic process for determining the precise problem. For discussions of problems of dealing with learning disabilities and various proposed therapies, reference is made to the following: *Dyslexia: Theory and Practice of Remedial Instruction*, by Diana Brewster Clark, Parkton, Md.: York Press, 1988: *The Upside-Down Kids: Helping Dyslexic Children Understand Themselves and Their Disorder*, New York, N.Y.: M. Evans & Co., 1991; *Teaching the Learning Disabled*, Bill R. Gearheart, C. V. Mosby Company, 1976; *Introduction to Learning Disabilities*, Hallahan and Kauffman, New York: Prentice-Hall, 1976; *Common Sense about Dyslexia*, Anne Marshall Huston, Lanham, Md.: Madison Books, 1987; and *Dyslexia*, Elaine Landau, New York: F. Watts, 1991.

To a considerable degree, solutions to the various learning disabilities continue to be empirical. Good results can be obtained by practical case-by-case methods. If a method works to alleviate a particular disability, it is adopted, and, conversely, if it does not work, it is appropriately discarded.

The present invention offers a practical tool, usable either therapeutically or diagnostically, to those involved in the problems of the learning disabled.

SUMMARY OF THE INVENTION

The basic concept of the present invention is to stimulate, by challenge and encouragement, the latent skills of those who have mild impediments in reading, spelling, and pronouncing words, by stimulating thought processes regarding word composition. The inventive process can be a diagnostic aid. Further, it addresses the specific problem of SSS with its use of color, wherein the therapist can choose the color that works best for the particular child. The inventive process, which has not heretofore been practiced or recognized by those skilled in the art, has been developed primarily as a limited, but effective and easily practiced, therapy primarily for children who have begun to read. Although it has also been found to be useful in assisting persons of all ages suffering from dysfunctions in processing words, and is useful in stimulating mental alertness in the elderly, for ease of reference throughout, the inventive method will be described in reference to a child, and, more specifically and arbitrarily, to a male child.

The concept of the invention is to provide exercises in the form of games in which there is held out to the child the prospect of the reward of winning. In the case of therapy for one child, the game is cast in the form of solitaire. For group therapy, two or more children can be instructed to play an adversarial-type game in which there will be a winner, or a team of winners, if the therapist believes that the competitive situation will not be harmful. Another form of the invention emphasizes a memory format.

The invention employs therapeutic and diagnostic teaching aids in the form of cards having letters and combinations of letters imprinted thereon, preselected for their probability of recurrence in simple words, which can be combined by the child to form words according to predetermined rules calculated to challenge latent reading, spelling, and pronunciation abilities, and to encourage the child to strive to improve these skills. These same teaching aids can also be used therapeutically to improve alertness and the ability to concentrate, accomplished by the use of the teaching aid cards to encourage the child to remember which cards he has played, as well as the cards played by other participants in the exercise, without overtaxing the child's capacity to cooperate in the therapy session.

OBJECTS OF THE INVENTION

It is therefore among the objects of this invention to provide a teaching method and aid for use in providing therapy for persons dysfunctional in reading, spelling, and pronunciation skills; to provide therapy for some persons afflicted with dyslexia; to enhance the vocabulary of persons having reading disabilities; to teach and encourage poor readers to make use of dictionaries; and to reduce inhibitions and to inspire confidence in persons having speech or pronunciation dysfunctions.

The subject invention offers no panacea for SSS, but the use of colored face cards complements other objects of the invention for use in therapy sessions in which it is known that the participating dyslexic children are amenable to certain predetermined colors. It is an object of the invention, in these cases, to provide face cards which are coated with the color most beneficial to the particular form of dyslexia.

Since, on an average, it requires from ten to fifteen years for a new concept in the learning disability field to become accepted by the professional community, it is another object of the invention to employ the patent system to accelerate acceptance of a novel method for treating certain forms of dyslexia by use of the inventive colored teaching cards.

The foregoing and other objects, features, and advantages of this invention will become apparent from the description set forth hereinafter when considered in conjunction with the accompanying drawings.

DESCRIPTION OF PREFERRED EMBODIMENTS OF THE INVENTION

Initially, the dysfunctional child is introduced to low level challenge spelling exercises. It is contemplated that he will be closely supervised by a therapist in the exercise, and that there will be considerable interaction. As the child progresses, he may enjoy conducting exercises unsupervised. For this reason, it is recommended that he stack words formed in the spelling order in a words-formed pile, so that the therapist can check the pile and ask him to pronounce the words, and perhaps use the words formed to instigate other inquiry and word play.

Figure 1:
FIG. 1 is a schematic display of the inventive teaching aid cards at the start of a therapy session.

Thus, as shown in FIG. 1, the child is shown a display of five letter cards and encouraged to form a word from two or more of the five letters, if possible. A particularly alert child might recognize that the letters R E X form the Latin word REX. Since proper names are not allowed, REX, the name of a dog, might generate some discussion of what is and what is not a proper name. If the therapist approves REX, the child removes the three letters from the display and places them, in the proper order, in the word-formed pile. The child is praised for his recognition, and permitted to replace the three withdrawn cards with three new cards drawn from the draw deck 1.

The complete draw deck 1, FIGS. 1 through 4, comprises 127 cards in the preferred embodiment of the invention. The total number of cards for each letter or combination of letters in the deck is preselected to maximize word formation permutations at this learning level.

The word-forming process continues for a second round, and for subsequent rounds until all cards in the draw deck 1 have been formed into words, or until the child has reached an impasse, and is unable to form another word. In either event, he is praised for his accomplishment in forming the words in the word pile 2. If he is unable to exhaust the draw deck and to use all the letters to form words, the remaining unused cards are counted, and the child is encouraged to better his total, i.e., to have fewer letter cards remaining, at the end of the next session. The child who has exhausted his cards with formed words is praised, and is encouraged, with questions and suggestions, to move to a more challenging level of word formation.

Figure 2:
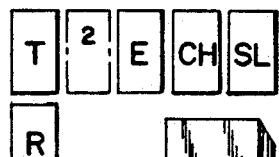
FIG. 2 is a schematic display of the inventive teaching aid cards wherein the dysfunctional child has been encouraged to commit to a word-forming exercise.
Figure 3:
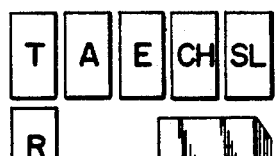
FIG. 3 is a schematic display of the inventive teaching aid cards at an intermediate stage of instruction.
Figure 4:
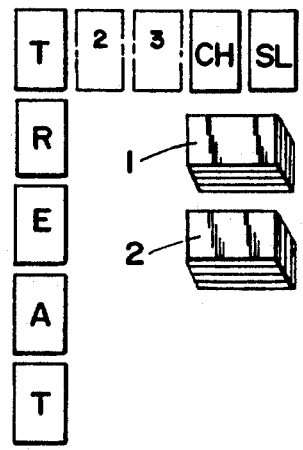
FIG. 4 is a schematic display of the inventive teaching aid cards showing a learning progression from the card display of FIG. 3.

FIGS. 2, 3, and 4 illustrate a progression from the display of FIG. 1. The child is encouraged to think ahead and to envision possible words which are not immediately visible to him in the display. Thus, the child is encouraged to "commit" one letter to another, and is asked which two letters would most probably fall together in a word. There are many possibilities: ER is the likeliest combination, but these letters would most commonly fall at the end of the word, and it is easier to summon words with beginning letters. In this case the child chooses to commit the R to the T, which leaves a blank space where the R card had been in the original horizontal display. The R card is placed under the T, and must remain there, in that order. The therapist asks the child what words can be formed that begin with TR, sounding out the letters and perhaps giving hints. The child, depending upon his skill and imagination, might respond TRAIN, or TREE, or even TROUBLE, since the vertical commitment of letters can contain more than the original five letters in the horizontal display.

The child draws another letter to fill the blank space. In FIG. 3 the letter drawn is an A. If the therapist is reluctant to go for AXE, the next card drawn is another T. Depending on the level of skill, the child might see EAT, or ATE, or the supervisor might assist in the formation of TREAT, as is shown in FIG. 4. The removal of TREAT to the word-formed pile 2 leaves three vacancies in the five-card display, which are then replaced by drawing three cards from the draw deck 1 in order to continue the exercise.

The commitment of one letter to another, as was done in the above example of TR, is an important aspect of the exercise. Many of the cards are imprinted with pre-committed letters, i.e., CH, IN, IVE, or ST. Such combinations force the child to mentally compute word possibilities as well as the probabilities, and to realize that some combinations are as likely to begin a word (CH) as end it, whereas others, such as IVE, or ING, are more likely to fall at the end of a word. Such mental calculations are important steps for certain dyslexics, whose perceptual difficulties may cause them to reverse or transpose beginnings and endings. Each step of the exercise may be called a commitment made toward word possibilities, and a decision about letter and word probabilities. To create space for new cards, commitments must be continually made, of one card to another, and questions asked of oneself, or by the therapist. Would an A more likely precede or follow an R? Would it be better to place TH below an I, or would it be better to place the I below the TH?

After extensive testing, a deck of 127 cards was determined to be best for the inventive method, comprising the following letters and combinations of letters of the alphabet:

| A | N | AB | OB | TR |
|---|---|----|----|-----|
| B | O | AD | OG | ST |
| C | P | AG | OO | PR |
| D | QU | AM | ON | FL |
| E | R | AN | OP | ICK |
| F | S | AP | OU | IKE |
| G | T | AT | UB | ING |
| H | U | ED | UT | IVE |
| I | V | EN | CH | INK |
| J | W | ET | SH | ICE |
| K | X | IN | TH | IME |
| L | Y | IP | SL | INE |
| M | Z | IT | DR | | and wherein the cards include at least the following distribution of the letters of the alphabet:

A - eight
B - one
C - two
D - five
E - fourteen
F - two
G - two
H - three
I - five
J - one
K - one
L - five
M - three
N - six
O - one
P - three
QU - one
R - six
S - four
T - five
U - two
V - one
W - three
X - one
Y - three
Z - one
AB - one
AD - one
AG - one
AM - one
AN - one
AP - one
AT - one
ED - one
EN - one
ET - one
IN - one
IP - one
IT - one
OB - one
OG - one
OO - one
ON - one
OP - one
OU - one -continued UB - one
UT - one
CH - one
SH - one
TH - one
SL - one
DR - one
TR - one
ST - one
PR - one
FL - one
ICK - one
IKE - one
ING - one
IVE - one
INK - one
ICE - one
IME - one
INE - one These letters were found to provide a random mix of easily formed words, more difficult words, and interesting idiomatic words. With these letters, the child is encouraged to try, as his skills increase, letter combinations that enable him to form more advanced words, to consider the probabilities of letter combinations, and, generally, to become more aware of how words are formed. He may keep the usual and the unusual combinations in mind, and make a mental note of RINK for the next session, or HUB, or OBOE, or TINE. The procedure is also designed to encourage the child to become skilled in dictionary use, in order to resolve doubts about the spelling, pronunciation, and/or meaning of words that occur to him.

The therapy sessions are closely supervised by the therapist who guides and encourages the child's selection of letters, praises success, and requires that each word be pronounced and understood. As the child's skills further increase, the child is encouraged to anticipate word formation by making multiple commitments to the display of cards. In so doing, the child will learn that there are several possibilities in each instance, and will therefore be stimulated to try to form certain of the words which are now known to be available. In the process, the child has been exposed to several new words and their meanings, and probably will have enjoyed his experience.

More than one child can participate in a therapy session in competition with other children, if the therapist deems the competition healthy. The one who has the most letters, or the most words, in his word pile 2 at the end is the winner.

Figure 5:
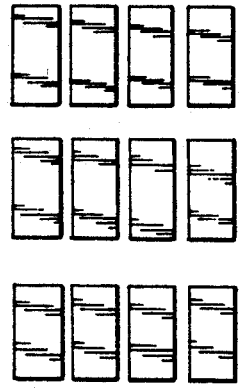
FIG. 5 is a schematic display of the inventive teaching aid cards arrayed at the start of an attention span and memory development exercise.
Figure 6:
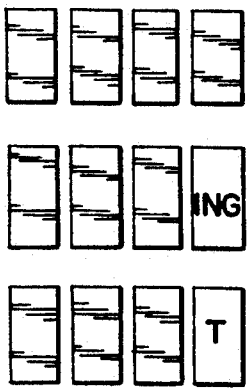
FIG. 6 is a schematic display of the inventive teaching aid cards of FIG. 5, illustrating the first step of the attention span and memory development exercise.

The letter cards can also be used in another format to enhance memory, employing the methods of the solitaire format involving pronunciation, thinking ahead to possible word formations, and interaction between the therapist supervising the exercise and the children. The memory exercise is started, in a preferred embodiment, with twelve cards turned face down, in three rows, as shown in FIG. 5. The exercise is practiced with two or more children, each taking a turn. The first child turns over two cards, as shown in FIG. 6. The letters turned over are IT. The child can choose to remove those letters to his word pile 2, or continue with the prospect of adding letters to the word, such as BIT, or SIT, or PIT. To do so may require considerable coaching from the therapist, with suggestions and clues as to what words might be formed. If the child continues, and turns over, for example, an R, his turn is over unless he can name a word that contains the letters RIT. The therapist may urge him to move the letters around, to reverse them, to pronounce TIR with short and long vowel sounds, so that he may be persuaded to announce continued play in the search for an E, to complete his word. If, however, instead of an R, he turns over a desired B, he may place BIT in his word pile, or he might be encouraged to continue, seeking, for example, BITE.

If he chooses to continue, he must announce, with each card turned over, what word he seeks. When he turns over a letter that does not fit into that scheme, or any other word scheme that he can think of, even with prompting, his turn is over. For instance, if he continues to turn over letters after BIT, he may announce that he is seeking the word BITE, but may turn over a second T. He might then announce that his sought word has become BITTER. When he reaches an impasse, with letters that do not make any word he knows, or any word he can be prompted by the therapist to announce, he turns the cards face down again.

The children practicing this exercise are instructed to attempt to memorize the turned-down cards and their respective locations in the display of twelve cards. The second child knows that the first child overturned the letters BITT, and he will attempt to remember those locations. If he should turn over an OO card, for instance, he will announce, at least with prompting from the therapist, that his word is BOOT, and then attempt to relocate the B and the T to complete the word.

In the process, each child participating in the lesson increases his or her attention span and memory skills. Properly supervised, although the format is a contest, there should be no losers, even in a competitive situation. The therapist can interact and become involved as much or as little as he or she thinks best, and the rules may be adapted to deal with perceived problems, case-by-case. The teaching technique can be as flexible as the individual therapist desires. Depending on his or her skill and experience, subtle changes may be made in the exercise to adapt to the abilities and progress of the children participating in the program. The therapist can interact and become involved as much or as little as he or she thinks best, and the rules may be adapted to deal with perceived problems. The subject invention can be a diagnostic aid for therapists, but it can also be a teaching aid for both experienced and inexperienced teachers. Although it is particularly useful for dyslexics, it is designed to be adaptable to best assist the teacher or therapist to deal with whatever spelling, reading, or speaking difficulties he or she detects. Whether a child is instructed individually or participates in group sessions is a decision that must be made by the therapist.

The subject invention deals with Scoptopic Sensitivity Syndrome by tinting the faces of the cards used in the inventive therapy method with a light colored nonglare surface. In particular, the colors sky blue and light yellow have been found to be very helpful. Forms of the dysfunction SSS range from very mild to severe, which complicates color screening. Accordingly, when a child's dyslexia is diagnosed as being caused in whole or in part by SSS, he can be tested with cards of various colors until the color of card that yields best results is identified. Thereafter, the child participates in therapy sessions with face cards colored to minimize his difficulty in processing full-spectrum light.

The foregoing disclosure and discussion relate to preferred exemplary embodiments of the invention. However, it should be understood that other variants and embodiments thereof will become apparent to those skilled in the art upon a reading of the specification taken in conjunction with a study of the attached drawings. Furthermore, it should be understood that such variants and embodiments are possible within the spirit and scope of the invention, as defined by the appended claims.

What is claimed is:

1. A therapeutic and diagnostic teaching aid for persons afflicted with learning dysfunctions comprising a series of cards having selected letters and combinations of letters selectively imprinted on the faces of said cards adapted for use by said persons to randomly select individual cards from said series of cards pursuant to a predetermined plan of therapeutic instruction, wherein said cards are selectively imprinted with the following letters of the alphabet:

| A | N  | AB | OB | TR  |
|---|----|----|----|-----|
| B | O  | AD | OG | ST  |
| C | P  | AG | OO | PR  |
| D | QU | AM | ON | FL  |
| E | R  | AN | OP | ICK |
| F | S  | AP | OU | IKE |
| G | T  | AT | UB | ING |
| H | U  | ED | UT | IVE |
| I | V  | EN | CH | INK |
| J | W  | ET | SH | ICE |
| K | X  | IN | TH | IME |
| L | Y  | IP | SL | INE |
| M | Z  | IT | DR |     | and wherein said cards include at least the following distribution of said letters of the alphabet:

| A - eight    | N - six    |
|--------------|------------|
| B - one      | O - one    |
| C - two      | P - three  |
| D - five     | QU - one   |
| E - fourteen | R - six    |
| F - two      | S - four   |
| G - two      | T - five   |
| H - three    | U - two    |
| I - five     | V - one    |
| J - one      | W - three  |
| K - one      | X - one    |
| L - five     | Y - three  |
| M - three    | Z - one    |
| AB - one     | UB - one   |
| AD - one     | UT - one   |
| AG - one     | CH - one   |
| AM - one     | SH - one   |
| AN - one     | TH - one   |
| AP - one     | SL - one   |
| AT - one     | DR - one   |
| ED - one     | TR - one   |
| EN - one     | ST - one   |
| ET - one     | PR - one   |
| IN - one     | FL - one   |
| IP - one     | ICK - one  |
| IT - one     | IKE - one  |
| OB - one     | ING - one  |
| OG - one     | IVE - one  |
| OO - one     | INK - one  |
| ON - one     | ICE - one  |
| OP - one     | IME - one  |
| OU - one     | INE - one. |

2. The therapeutic and diagnostic teaching aid of claim 1, wherein said cards are color-coated with colors amenable for use by Scoptopic Sensitivity Syndrome-afflicted persons.

3. The therapeutic and diagnostic teaching aid of claim 2, wherein said color-coated cards are provided with non-glare surfaces.

4. The method of teaching word formation, pronunciation, and vocabulary enhancement skills to students by use of a plurality of instructional cards constituting a deck having cards with preselected letters of the alphabet printed on the front faces of said cards, comprising the steps to be performed by each student:
   (a) stacking said deck of cards in random order;
   (b) removing a predetermined number of cards from said deck of cards and aligning said removed cards on a card-supporting surface;
   (c) committing one or more of said aligned cards to another one of said aligned cards which start the formation of a word;
   (d) replacing said committed cards with additional cards drawn from said stack of cards;
   (e) continuing to commit cards which form words from two or more of said aligned cards; and
   (f) continuing to commit cards which form words with previously committed cards.

5. The method of therapeutic and diagnostic teaching of students afflicted with dyslexia and/or scoptopic sensitivity syndrome, including the steps of:
   (a) diagnostically determining whether said student's reading ability is disoriented when he or she is exposed to full spectrum light reflection by having him or her attempt to identify black indicia imprinted on cards having white backgrounds, and noting whether disorientation occurs;
   (b) in those cases in which disorientation is observed, sequentially having said student attempt to identify black indicia imprinted on cards, each having a background of a different color of the full color spectrum;
   (c) noting which colored card causes the least disorientation;
   (d) providing said student with a full deck of instructional cards color-coated with the color determined to cause the least reading disorientation due to full spectrum light sensitivity, said instructional cards having black indicia imprinted on the front color-coated faces of said cards; and
   (e) using said full deck of colored instructional cards as a teaching aid to teach said student.

6. The method of teaching word formation, pronunciation, and vocabulary enhancement skills to students by use of a plurality of instructional cards constituting a deck having cards with preselected letters of the alphabet printed on the front faces of said cards, comprising the steps to be performed by each student:
   (a) stacking said deck of cards in random order;
   (b) removing a predetermined number of cards from said deck of cards and aligning said removed cards on a card-supporting surface;
   (c) placing said aligned cards face down on said card-supporting surface;
   (d) sequentially turning said cards face up;
   (e) removing those face-up cards, if any, which form a word from said aligned cards;
   (f) turning the remaining cards which had been turned face up, face down;
   (g) replacing said removed cards, if any, with new cards face down with said face-down aligned cards; and
   (h) repeating steps (d) through (g) until no cards remain in said deck of cards or until no further words can be formed.

7. The method of therapeutic and diagnostic teaching of students afflicted with dyslexia and/or scoptopic sensititivity syndrome including the steps of:
   (a) diagnostically determining whether said student's reading ability is disoriented when he or she is exposed to full spectrum light reflection by having him or her attempt to read black indicia imprinted on cards having white backgrounds, and noting whether disorientation occurs;
   (b) in those cases in which disorientation is observed, sequentially having said student attempt to read letters of the alphabet imprinted on cards, each having a background of a different color of the full color spectrum;
   (c) noting which colored card causes the least disorientation;
   (d) providing said student with a full deck of instructional cards coated with the color determined to cause the least reading disorientation due to full spectrum light sensitivity, said instructional cards having black letters of the alphabet imprinted on the front color-coated faces of said cards;
   (e) instructing said student to stack said deck of cards in random order;
   (f) instructing said student to remove a predetermined number of cards from said deck of cards and to align said removed cards on a card-supporting surface;
   (g) instructing said student to sequentially remove cards from said deck of cards and to place said cards adjacent one or more of said aligned cards to form a word;
   (h) instructing said student to remove two or more of said aligned cards to form a card pile of formed words;
   (i) instructing said student to replace said two or more removed cards from the said deck of cards; and
   (j) instructing said student to repeat steps (e) through (i) until the number of cards in said deck is reduced to the lowest possible number commensurate with the skill of said student.

8. The method of claim 7, including a step to follow step (f) comprising instructing said student to commit one or more of said aligned cards to another one of said aligned cards which start the formation of a word.

* * * * *